July 15, 1941.  C. L. DAVIS  2,249,271
AIRCRAFT ENGINE EXHAUST SILENCER AND BACK PRESSURE REDUCER
Filed Nov. 28, 1938  2 Sheets-Sheet 1
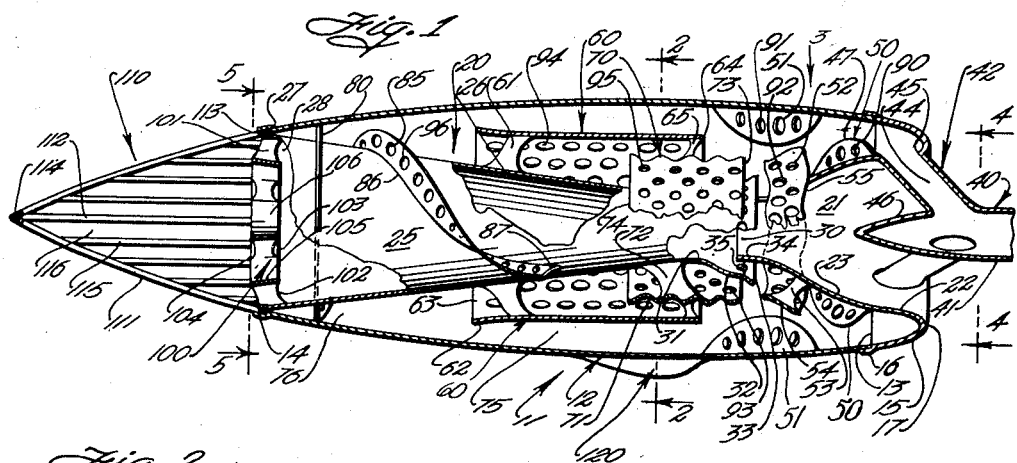
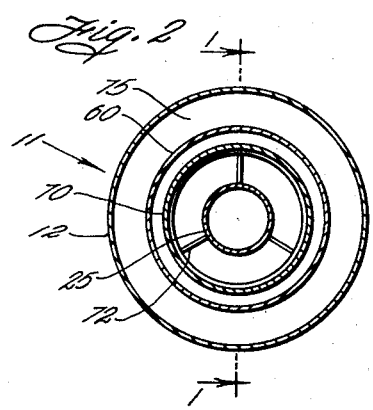
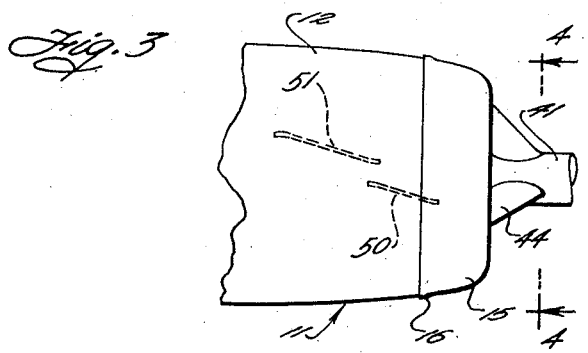
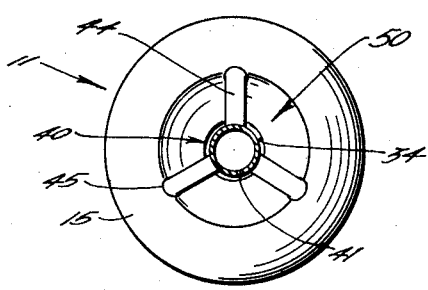
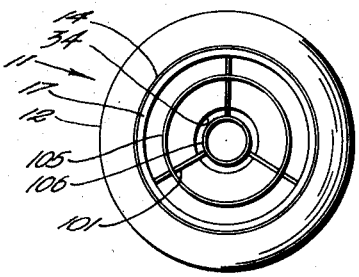
Inventor
CURTISS L. DAVIS
By Hazard and Miller
Attorneys July 15, 1941.    C. L. DAVIS    2,249,271
AIRCRAFT ENGINE EXHAUST SILENCER AND BACK PRESSURE REDUCER
Filed Nov. 28, 1938    2 Sheets-Sheet 2
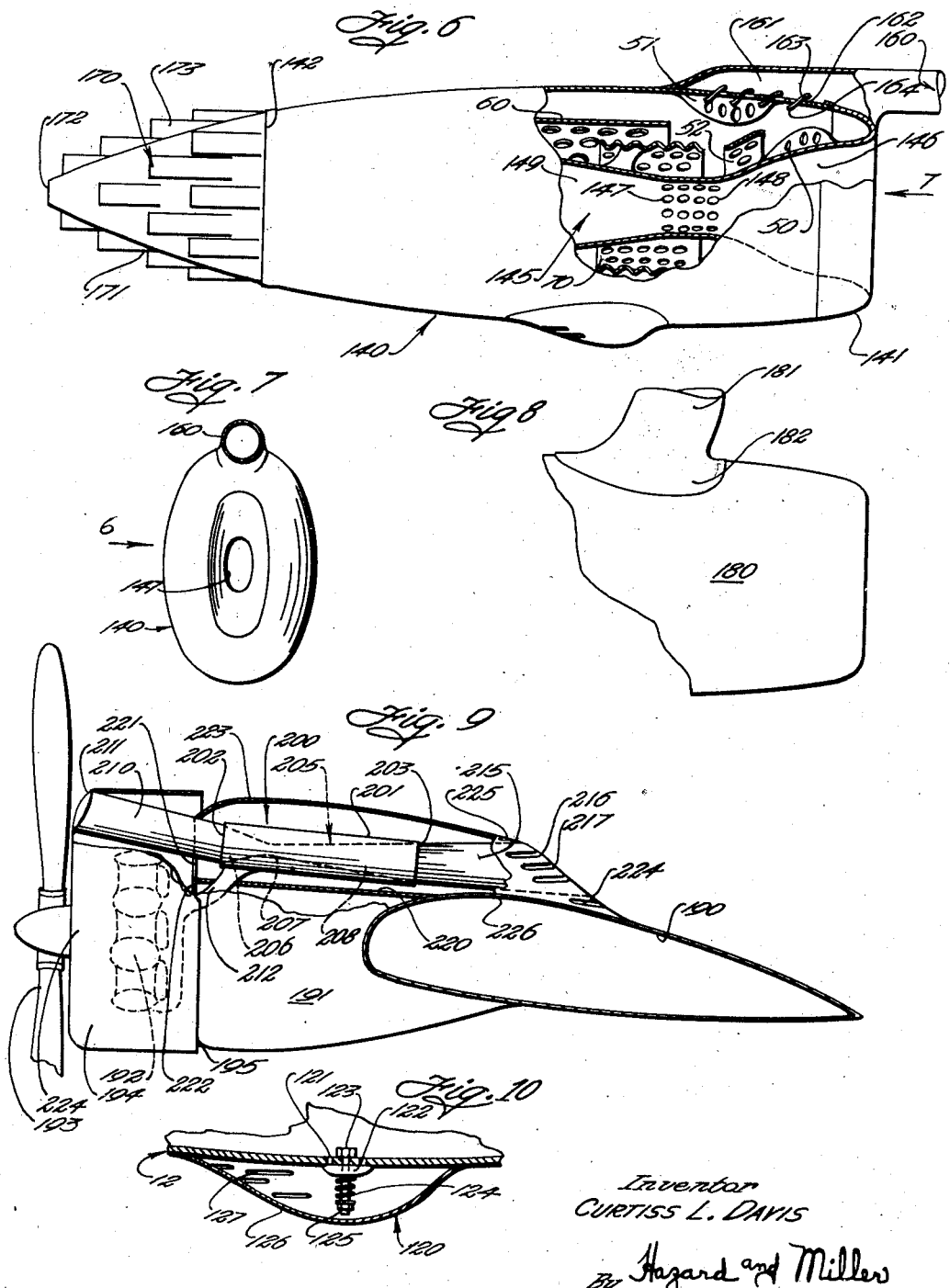
Inventor
CURTISS L. DAVIS
By Hazard and Miller
Attorneys Patented July 15, 1941

2,249,271

UNITED STATES PATENT OFFICE 2,249,271

AIRCRAFT ENGINE EXHAUST SILENCER AND BACK PRESSURE REDUCER

Curtiss L. Davis, Los Angeles, Calif.

Application November 28, 1938, Serial No. 242,755

12 Claims. (Cl. 181—51)

My invention relates to an air craft construction in which I incorporate a silencer for the engine exhaust. This also is operative as a back pressure reducer or eliminator, the application of my invention being to air craft engines of the internal combustion type in which in the present type of construction the greater percentage of the noise is from the exhaust of the engine and quite a minor percentage due to the propellers and a still lesser amount results from the air flow over the wings, fuselage and other parts of the aeroplane. The silencing of the exhaust of the internal combustion engines as utilized on aeroplanes is highly desirable especially so in passenger transport planes to reduce the noise and thus to be able to eliminate the' major portion of the sound-proofing of the passenger cabins and pilots' cock-pit and other parts of the craft occupied by the crew. For military and naval purposes the silencing of the engine is very important as it makes it more difficult for enemy forces to determine the approach of an aeroplane by the sound generated in the aeroplane. Many of these sound detectors are so delicate and accurate that the approach of aircraft may be determined from great distances, hence any silencing for military purposes would be of great benefit.

Another feature of my invention which is decidedly important irrespective of the silencing of the exhaust is the material reduction and practical elimination obtained of the back pressure on the internal combustion engine due to exhausting the exploded gases. By such reduction and elimination I have been able to speed up air craft engines and thus develop materially more power.

A principle involved in the operation of my invention is the use of the slip stream from the propeller. Thus my invention is operative with the aeroplane on the ground either stationary or taxiing and the slip stream has a much greater effect when the air craft is travelling as the air flow is much increased. This air flow of the slip stream by my invention is utilized to create a positive suction on the exhaust gas flow from the internal combustion engine and thus reduce the back pressure and incidentally thereto reduce the noise, that is, the pulsations which cause an objectionable sound.

Another characteristic of my invention is utilizing the slip stream from the propeller in a construction having the characteristics of a Venturi tube or pipe and operating on the Venturi principle of providing a contracted throat in an air passage having substantially a straight line flow except for the convergence in front of the throat and the divergence of the travel rearwardly of the throat. It is well known that the Venturi principle in hydraulics and in the flow of gases creates an increased velocity of flow at the Venturi throat and the reduction in pressure. At the area of the reduced pressure I provide for sucking in the exhaust gases from the internal combustion engine. These gases are thus caused to mix with the air blast of the slip stream and be carried rearwardly in the expanding end of the Venturi tube, such air and gases then being exhausted. At the tail end of the Venturi tube I provide outlets which break up the combined blast of the slip stream air flow and the exhaust gases to eliminate the remaining noise.

Another object and feature of my invention resides in building in or confining the Venturi tube in a casing of the silencer. This casing is preferably carefully stream-lined to reduce resistance to air flow due to the travel of the aeroplane through the air and of the portion of the slip stream of the propeller which is not forced through the Venturi tube. A further characteristic is that in the casing and surrounding the Venturi tube I have a series of deflectors, baffles and obstruction devices which engage the exhaust gases from the engine, produce a rotational swirling motion of the gases as a whole and break this flow up by using perforations and corrugated surfaces on the chains, baffles and obstructions so that the pulsations causing the distinct noise of the exhaust is reduced.

Another characteristic of my invention is having the various gas deflectors, vanes, etc. positioned between the contracting part of the Venturi tube and the casing in order to positively deflect the exhaust gases towards the intake of such gases in or in proximity to the throat of the venturi. However, a space between the casing and the venturi is provided to develop what might be termed a dead gas or return flow space by which the exhaust gases which do not enter the throat of the venturi are carried rearwardly inside of the shell and outside of the expanding part of the trailing end of the venturi and come to a dead end from whence they are deflected again forwardly towards the neck of the venturi and are sucked into such neck and thus being mingled with the slip stream through the Venturi tube. A further feature of my invention resides in the effective cooling of the equipment and the exhaust gases on account of the air flow over the outside of the shell or casing and further by the use of the slip stream which links with the hot gases and also extracts heat from the Venturi tube.

My invention also has another feature of importance in that it practically eliminates or materially reduces the danger of a back fire or the explosion of gases discharged from the engine. With the combustion in such engine. This is a feature of great danger in aeroplanes as it frequently happens that in the throttle control of the engine that large volumes of unexploded gaseous fuel is discharged from the engine exhaust and immediately takes fire outside of such exhaust in close proximity to the nacelle of the engine, the fuselage or the wings or other parts of the aeroplane adjacent the exhaust pipes. My invention does not prevent this explosion of the unconsumed gases in all cases but where an explosion takes place in my silencer, it has no damaging effect. Practically the only disagreeable result is the discharge of clouds of black smoke.

My invention is illustrated in connection with the accompanying drawings, in which:

Fig. 1 is a longitudinal section through one typical form of my invention in which the Venturi tube is cut into two distinct parts, the throat having an outward flare from the rear portion, this flare being in front of the expanding trailing portion of the Venturi tube in order to form a scoop for the inflow of the exhaust gases to the area of decreased pressure within the throat. In the illustration of Fig. 1 the slip stream is directed centrally towards the Venturi tube and the exhaust gases also approach through an exhaust pipe symmetrical with the silencer and are then distributed laterally to the forward or nose portion of the shell. Fig. 1 may be considered as a longitudinal section on the line 1—1 of Fig. 2 in the direction of the arrows.

Fig. 2 is a transverse section on the line 2—2 of Fig. 1 in the direction of the arrows.

Fig. 3 is a partial plan or outside view taken in the direction of the arrow 3 of Fig. 1 with parts broken away.

Fig. 4 is a frontal section taken on the line 4—4 of Fig. 1 in the direction of the arrows. This may also be considered as a front elevation with a section through the exhaust pipe of the engine.

Fig. 5 is a transverse section on the line 5—5 of Fig. 1 in the direction of the arrows and may be also considered as a rear elevation of the silencer after removal of the streamlined tail distributor.

Fig. 6 is a side elevation of a modification taken in the direction of the arrow 6 of Fig. 7, partly broken away and illustrating the Venturi tube having intake perforations at the throat for the inflow of the exhaust gases and also showing the stream-line tail as having disseminating openings.

Fig. 7 is a front elevation taken in the direction of the arrow 7 of Fig. 6 with a section through the exhaust pipe.

Fig. 8 is a side elevation of a silencer of the construction of either Figs. 1 or 2 with the exhaust gases brought in through the top by an exhaust gas pipe instead of leading the gases into the shell in the manner of Figs. 1 or 6.

Fig. 9 is a side elevation partly broken away showing the nacelle mounting of an aeroplane engine with my silencer built into the nacelle and developing an air flow around the shell of the silencer.

Fig. 10 is a detailed longitudinal section of part of the shell and a relief valve assembly.

Dealing first with the construction of Figs. 1 through 5, the silencer proper is designated by the numeral 11. This is provided with a shell 12 having a front circular edge 13, it being understood, however, that this may be of other contours and a rear flanged edge 14, this also being circular or corresponding in contour with the front edge 13. The shell is preferably stream-lined if it is a type to be spaced from other parts of the aeroplane such as the fuselage, the engine cell or the wings, the stream-lining of course depending on the proximity to other parts of the aeroplane. A blunt annular intake nose piece 15 is secured to the shell, this being illustrated as having a flange 16 fitting over the forward edge 13 of the shell. The nose has a reverse and inward bend as indicated at 17. The Venturi tube construction designated by the assembly numeral 20 has a front converging section 21. This has a frontal inward surface 22 extending from the reverse bend 17, an inwardly coned section 23 which forms the forward converging part of the Venturi tube. This may be given sweeping curves concave on any radial longitudinal plane to develop a desired stream-line flow of the central air blast from the slip stream of the propellers without the formation of undesirable eddies. The trailing portion of the venturi designated 25 is cone shaped and shown as having an evenly flared side wall 26. This continues rearwardly to a welded ring connection 27 to the rear portion of the shell adjacent the flange 14. Thus the trailing end 28 of the Venturi tube has a circular opening or an opening defined by the shape of the flange 14. The throat 30 of the Venturi tube is formed by the reverse curved section 31 of the rear portion 28 of the Venturi tube and an outwardly flared scoop section 32 terminating in the forward edge 33. This edge is concentric to the trailing throat section 34 of the forward portion 21 of the Venturi tube. Thus the throat is in effect broken, there being an annular space indicated by the measurement line 35 between the rear edge of the trailing throat section 34 and the reverse bend 31. There is also an intake or scoop area depending upon the spacing of the forward edge 33 and the trailing portion 34.

The intake for the exhaust gases is by the exhaust gas spreader assembly 40. This is illustrated as having an exhaust pipe 41 which leads from the engine, there being a collector for the exhaust from all of the cylinders of a multi-cylinder engine and if such engine is of a radial type the collector ring is made accordingly so that all of the exhaust gases flow rearwardly through the tube 41. A tubular spider 42 has a series of tubular arms 44 which diverge at an angle from the exhaust manifold pipe 41 and are connected as indicated at 45 at the inside surface 22 of the nose construction formed by the outside surface 15 and the reverse turn 17. These spider tubes are stream-lined. There is also a stream-line tail piece 46 of the exhaust manifold 41. This construction leaves a large intake area 47 for the air blast such as the slip stream from the propeller. It is to be understood that my silencer should be installed in an aeroplane where the slip stream may be driven into the entrance end of the venturi 20. With this construction and with proper contours, the exhaust manifold 41 and the spreader and delivery tubes 44 do not materially interfere with the flow of the slip stream.

The flow of the slip stream through the venturi develops the suction action on the exhaust gases delivered into the shell 12 and distributed substantially evenly around the intake nose piece 15. A characteristic of a Venturi tube properly designed is that at the throat portion there is a material increase in the velocity of flow of the gases or liquids which flow through such venturi and at the same time there is also a decrease in pressure at the throat. Therefore, in the area of the throat due to the reduced or in some cases negative pressure, there is a decided suction. The exhaust gases are therefore positively sucked or drawn into the scoop section 32 of the Venturi throat, for as above defined, this has an annular opening between the forward edge 33 of the scoop and the trailing portion 34 of the frontal cone 21 of the Venturi tube, hence a major proportion of the flowing and distributed exhaust gases are sucked into the throat of the venturi tube and become mixed with the air blast therethrough from the slip stream of the propeller and thus such portion of the exhaust gases are carried through the trailing reverse cone 25 of the Venturi tube and discharged at the open rear end which is defined by the shape of the welding ring 27. By this construction and also due to the comparatively free and directed flow of the exhaust gases to the throat of the venturi, there is a positive suction on the exhaust gases which materially reduces and as I have found, practically eliminates the back pressure of the exhaust of the internal combustion engines which are used to drive the aeroplane, hence by making proper use of the slip stream from propellers I accomplish the highly desirable purpose of deducing the back pressure of the engine exhaust, therefore adding materially to the power developed by the engine and hence if desired the speed of rotation of the propellers or for the same speed, a throttling of the fuel supply.

I facilitate the distribution of the exhaust gases and their direction towards the open throat of the venturi by means of the forward set of deflecting vanes 50. These are shown attached on the outside of the cone surface 23 of the leading cone 21 of the venturi and such vanes are given a warp or a twist as indicated in dotted lines in Fig. 3 to develop a somewhat circular or screw type of motion of the exhaust gases entering the nose piece at 45. Further, to continue the swirl I employ a second or rearward set of deflection vanes 51. These are secured by their outer edge to the shell 12 extending both forwardly and rearwardly of the leading edge 33 of the flared throat portion 32 of the venturi. These vanes have a warp or a twist continuing that of the vanes 50 and maintain the circular or screw type of flow of the exhaust gases. Such vanes also function to divert a large proportion of the exhaust gases towards the throat of the venturi. As a further means of directing the intake gases towards the Venturi throat, I employ a wedged deflecting ring 52. This encircles the rear portion of the forward cone 21 on the outside and is secured to such portion by substantially radial struts 53 which attach the ring 52 to the outside of the intake cone 21. This ring may be considered as a partial cone having a surface 54 (note Fig. 1) which is substantially parallel to and concentric with the adjacent portion of the cone 21, however this has a slight warp for proper stream-line flow of the exhaust gases and is moreover provided with waves front and rear edges 55. This ring 52 catches a large proportion of the exhaust gases directed into a circular swirl by the forward vanes 51 and directs such exhaust towards the intake of the throat of the venturi.

My construction of the silencer is not intended to cause the complete and direct flow of the exhaust gases into the venturi but to allow a certain proportion of such gases to be diverted and flow rearwardly in the space between the shell 12 and the trailing cone 25 of the Venturi tube. I find that this space when properly baffled, forms an excellent silencing chamber, however, it is necessary to make somewhat of a separation of the flow of the exhaust gases. These gases travel at quite a high relative velocity, the shell of course being considered as stationary in regard to the flow movement of the exhaust gases, the vanes 50 and 51 in producing a circulating movement of the exhaust gases also producing a centrifugal force tending to divert such gases outwardly towards the shell. I therefore employ a substantially straight flow separating cylinder 60. This is supported by struts 61 at the rear which are connected to the rear cone 25. The cylinder has a slight outward flare 62 at the rear edge presenting an annular space 63 surrounding the rear portion of the cone 25. The front edge of the cylinder 60 is indicated at 64 and has a forward set of struts 65.

These struts if desired may be directly connected to the forward portion of the reverse cone 25 of the Venturi tube, however I find it to advantage to provide an inner flow directing cylinder 70. This is illustrated as being corrugated as shown by the numeral 71 and the lead line therefrom. This cylinder is supported by internal struts 72 which connect to the reverse cone 25 immediately rearwardly of the throat of the venturi. The forward edge 73 of the inner cylinder is spaced slightly rearwardly from the forward edge 33 of the venturi throat and the trailing edge 74 is positioned a considerable distance rearwardly of the forward edge 64 of the outer cylinder 60.

These flow separating cylinders 60 and 70 together with the swirling action developed by the portion of the exhaust gases which do not enter the throat of the venturi are directed rearwardly mainly in the annular space 75 between the cylinder 60 and the shell 12 and travel towards the converging dead gas space 76 between the trailing portion of the shell 12 and the trailing edge of the rear cone 25 of the venturi. In this space I have a substantially circular perforated baffle ring 80. This preferably forms a complete circle and may be attached to the shell or to the venturi or to both, however for purposes of assembly and dis-assembly, it is advisable to have this attached only to one. Extending forwardly from the baffle ring 80 I provide one or more screw fins 85. These have their inner edge 86 attached by welding or the like to the outside of the trailing cone 25, therefore on account of the fins having both a helical and a spiral contour, they tend to develop a rotational motion of the exhaust gases which are in close proximity to the outside of the cone 25. These fins terminate at a forward edge 87 located inside of the cylinder 60 but preferably rearwardly of the trailing edge 74 of the inner cylinder 70. On account of the suction at the throat of the venturi, the exhaust gases which have been forced rearwardly in proximity to the shell 12 towards the dead end are blocked at this dead end from further movement and then have a forward movement of flow along the outside of the reverse cone 25 of the venturi. As above mentioned, a circular movement is developed by the screw fins 85. These gases are to a certain extent confined by the outer cylinder 60 and also by the inner cylinder 70 and as the forward edge of this inner cylinder 73 is in close proximity to the open mouth of the Venturi throat, such gases are sucked into the throat together with the gases which have followed close to the forward cone 21 of the venturi.

In order to prevent a distinct and definite flow of exhaust gases as above defined by the various vanes, cylinders and the fins such as 85, it is desirable to have all of these structures with perforations. For instance, in the vanes 50 there are illustrated a series of perforations 90, in the vanes 51 perforations 91, the ring 52 has perforations 92, the portion 32 of the throat has perforations 93, the cylinder 60 has perforations 94, the corrugated cylinder 70 has perforations 95, the ring 80 also has perforations and the fin 85 has perforations 96. These perforations are operative as above mentioned to break up the flow of the exhaust gases. They also function materially in destroying vibrations which would otherwise cause a sound or disagreeable noise of the exhaust.

While I have illustrated the various internal rings, vanes and fins in a more or less definite position in Fig. 1 as regards the Venturi tube, the shell and the inlet for the exhaust gases, it is to be understood that these may be materially changed in structure and in position. One of the purposes of using the corrugated inner cylinder such as 70 and having this supported from the Venturi tube by a single set of struts to permit expansion and contraction due to the changes of temperature. Also the outer cylinder 60 is supported in part on the Venturi tube and at the forward end on the cylinder 70. This also accommodates the expansion and contraction. It is to be understood that the various supporting brackets are made in the manner of thin plates which may be edge on to the flow of the gases or may be slightly warped to maintain the circular flow. It is highly important to have the various baffles arranged so that there is not an accumulation of hot gases in any particular place in the silencer and should such hot localities or spots develop, the arrangement or location of the baffles, etc. may be changed. These hot spots on the shell may be readily determined by the change of color of the shell and particularly at night by a tinge of color or by the use of temperature measuring instruments. In constructing the silencer, care should be exercised that this does not become resonant to the vibrations, that is, the frequency of the exhaust discharge from the engine but the construction of the shell and the baffles, etc. must be such that the sound which is generated where the exhaust gases enter the shell is absorbed. A good deal of the absorption of the sound appears to be by an interference developed through the use of the perforations in the various baffles, cylinders, etc.

At the rear end of the diverting cone 25 of the Venturi tube I employ a straight line flow device designated by the assembly numeral 100. This employs a number of radial plates 101 which are connected at their outer edge to the inside of the cone 25, three of these being shown, note Fig. 5. These plates are preferably slightly curved with a concave curve at the forward edge indicated at 102 and straight transverse edges 103 so that the rear edge 104 extends outwardly slightly beyond the welding ring 27 and the flange 14. These plates retain an outer ring 105 and terminate at an inner ring 106. These rings are very slightly tapered forming sections of the cone with the apex end pointing inwardly towards the throat of the venturi. As it sometimes happens that due to an irregular air flow through the venturi or some irregularity of the flow of the exhaust gases into the throat of the venturi, the air with the exhaust gases travelling rearwardly through the reverse cone end 25 develop a somewhat circular motion. Therefore the radial plates 102 and the rings 105 and 106 are to break up the circular motion and discharge the gases with a more or less straight line flow parallel to the axes of the venturi.

In view of the fact that it is not desirable in aeroplane construction to discharge the air and exhaust gases from the Venturi tube directly to the atmosphere, I employ a streamline and tail discharge device 110. In the construction illustrated of Fig. 1, this is made with longitudinal main ribs 111 of which there may be four placed 90 degrees apart and secured at their forward ends 113 to the welding ring 27 or the flange 14. These are tapered in the manner of a cone having an apex end 114. There are a series of longitudinal grid strips 115 extending rearwardly from the welding ring 27 to the main ribs 111 and 112. These ribs and strips are preferably quite narrow leaving quite wide longitudinal spaces 116 for the discharge of the exhaust gases mingled with the discharge slip stream of the propellers which pass through the Venturi tube. This construction thus functions to break up the discharge flow and eliminate any vibration or sound which might be produced by a discharge past the plates 111 and the rings 105 and 106.

As it is desirable to make provision for quick discharge or relief of pressure due to a back fire in the shell of the silencer, I employ a relief valve assembly 120, note the detail in Fig. 10. The shell 12 is provided with a series of ports 121. These are preferably round perforations and a valve plug 122 seats on the outside of the shell covering these ports. This plug is maintained seated by use of a bolt 123 extending through the shell and having a compression spring 124 coiled thereon and engaging between the nut 125 and the valve plug 122. This is all enclosed by the housing blister 126 which is bolted or welded to the outside of the shell and has a series of discharge slots 127. By this construction should there be undue pressure developed in the shell by a back-fire of unexploded gases from the engine, a large proportion of the exploded gases are of course discharged through the Venturi tube but if the pressure is excessive this pressure relief valve opens, exhaust gases are discharged through the port 121 and through the slots 127. It is preferable to place this relief valve in the lowest part of the shell so that should there be any condensation of water from water vapor in the shell it will collect at this lowest point and the plug is usually sufficiently free to allow drip of the condensed water.

The construction of Figs. 6 and 7 involves a different construction of the Venturi tube. In this case I employ a shell 140 with a blunt annular nose 141 at the front somewhat similar to the construction of Figs. 1 through 5. The rear end 142 of the shell is substantially the same as of the construction formerly described. There is a difference however in the Venturi tube designated 145. This has a forward contracting cone 146 merging into the nose and with reverse concave and convex curves leading to the throat 147 which is provided with a series of perforations 148. The diverging cone 149 may be substantially as illustrated in the prior figures. In this construction the shell and the Venturi tube are illustrated as substantially oval in any transverse cross section as shown in Fig. 7. This is for the purpose of facilitating a different placement of the silencer relative to the aeroplane construction.

In this case the exhaust manifold 160 leads from any suitable cooling ring or partial manifold of the engine and there is an entry indicated at 161 through the upper part of the shell adjacent the nose 141, the shell being shown as having a series of perforations or opening 162 with deflecting fins 163 bent upwardly and 164 bent downwardly. These also may be developed to have a warp or twist. In this case the exhaust gases are not led into the shell concentric with the Venturi tube but on one side adjacent the forward portion of the shell, however these gases are diverted and given a circular flow by means of the fins 163 and 164 and due to their lateral warp they are also acted upon by the various vanes, fins, ring and cylinders similar to those of Figs. 1 to 5 and designated by the same numerals for similar constructions. In this arangement however there is no scoop or open mouth at the throat of the Venturi but due to the negative pressure developed in the throat of the Venturi, the exhaust gases are drawn in through the perforations 148 which may be designated as inlet ports. In this case as in the former constructions a proportion of the exhaust gases flow rearwardly inside of the shell somewhat close to the shell surface and then have a return flow along the reverse cone 149 of the Venturi tube to the throat, this being there sucked into such throat and discharged at the rear end.

In the construction of Fig. 6 I also illustrate a modified form of tail discharge 170 which may also be used on the construction of Fig. 1 or vice versa. In this case I provide a somewhat cone shaped tapered tail 171 with a central exhaust port 172 at the apex or tail end of the cone structure. There are however a series of partial tubes 173 positioned in a staggered and overlapping relation around the cone of the tail considered circumferentially and also longitudinally. These preferably expose on the outside a partial cylindrical surface so that there is a direct streamline flow of air following the contour of the shell, the exhaust gases being carried outwardly by the slip stream from the propeller is travelling at substantially the same velocity or in some cases slightly higher than that of the stream of air past the tail of the silencer, therefore there is but little or no turbulence developed at the end of the partial cylinders 173, the exhaust gases and slip stream merging with the outside air blast and this without any appreciable noise. This type of tail surface is operative to direct the exhaust gases and slip stream from the propeller rearwardly and so broken up as to effectively silence any resonant noises developed in the silencer.

In view of the fact that it is necessary to have the exhaust gases enter the shell in various positions due to the manner of mounting the silencer on an aeroplane and in relation to the engine, Fig. 8 illustrates a different construction for the intake of the exhaust gases. In this case the shell is designated 180. The exhaust manifold pipe 181 is attached by a saddle 182 to the upper portion of the shell. Such shell may have perforations similar to 161 of Fig. 6 and also have various fins diverting the gas at the perforations. In this case the inflow of the exhaust gases is approximately at right angles to the axis of the shell and Venturi tube. Such gases however are diverted by the internal vanes, fins and other devices to produce a circulating motion described in connection with Figs. 1 through 5 and 6 and 7.

Fig. 9 is an illustration presenting the silencer built into the nacelle mounting forward of a wing. In this construction the wing 190 may be of a standard design and is illustrated as having a nacelle 191 extending forwardly. This has the mounting for the internal combustion engine 192 which drives the propeller 193. The usual engine cowling is indicated at 194 having a discharge of the air stream at the rear edge 195. In this construction the silencer designated 200 is installed in the upper part of the nacelle. This is shown as having a cylindrical shell 201 with a forward end 202 and a rear end 203. The Venturi tube 205 has the intake coned end 206 connecting at an opening in the end 202. This leads to the throat 207 and the reverse cone 208 for the discharge leads to an opening in the rear end 203. A tapered intake spout 210 is built in the cowl 194 and has a relatively large intake end 211 positioned adjacent the propellers to receive the slip stream thereof. This spout leads directly to the coned intake 206 of the Venturi tube. The exhaust manifold 212 leads into the shell adjacent the forward cone 206. The shell has vanes, baffles and cylinders much the same as in the construction of Figs. 1 through 5 and Figs. 6 and 7 providing for a dead end space between the rear end of the reverse cone 208 and the rear portion of the shell, the exhaust gases being drawn in through the throat of the venturi and are discharged through a diverging discharge duct 215 which leads to the rear portion 216 of the nacelle above the wing where there are a series of louvers 217. An important feature in this construction is maintaining a flow of air on the outside of the shell in order to keep this cool. Therefore concentric with the shell I employ a partition wall 220 which extends rearwardly from an opening 221 in the fire wall 222 at the forward end of the nacelle. This partition 220 is preferably concentric with the shell 201 and if this is cylindrical, the partition is preferably cylindrical on the bottom but at the sides extends upwardly to the top surface 223 of the nacelle. Therefore the air blast which enters the front opening 224 of the cowl 194 has a part of the air stream flowing rearwardly confined within the partition 220 and on the outside of the shell and also on the outside of the discharge duct 215. In this case the cooling air is shown as discharging through openings 224 adjacent the top surface of the wing and 225 adjacent the upper surface of the nacelle. In the particular illustration shown, the partition 220 terminates adjacent the upper surface 226 of the wing. Of course most of the air used to cool the engine escapes at the opening 195 but still there is a sufficient air flow to cool the shell of the silencer. It is to be noted that all of the slip stream air used to flow through the Venturi tube enters the silencer through the separate duct 210 independent of the flow of air over the cylinders of the engine for cooling purposes. Therefore the slip stream in the venturi is at atmospheric temperature and operates effectively to cool the exhaust gases as well as create a suction reducing the back pressure.

Various changes may be made in the details of the construction without departing from the spirit or scope of the invention as defined by the appended claims.

I claim:

1. In a device as described, a structure of an aeroplane having a silencer and back pressure eliminator built therein, such silencer having an elongated shell, a Venturi tube extending substantially centrally through the shell with a forward intake end connected to the forward part of the shell and contracting to a throat and a diverging tail portion expanding from the throat and connected at its rear end to a rear portion of the shell thereby providing a space between the shell and the Venturi tube, means to discharge the exhaust gases from an engine into such space and means to direct an air blast through the Venturi tube, the throat of the Venturi tube having an inlet means for the exhaust gases from the said space between the Venturi tube and the shell, a partition structure surrounding at least part of the shell and having an opening at its forward end for inlet air flowing longitudinally of the aeroplane structure and outlets at its rear end for such air whereby the air passing over the outside of the shell is operative to cool such shell.

2. In an aeroplane having an impulse engine and a propeller combined with a silencer and a back pressure reducer including a shell, a Venturi tube fitted in the shell substantially concentric therewith, the Venturi tube having a throat, a converging entrance end to the throat, the forward end of the entrance end being connected to the shell, the Venturi tube having an expanding trailing portion extending from the throat and connected at its rear portion to the shell, the throat having an inlet means, there being a space between the shell and the Venturi tube, a connection from the engine for the exhaust gases to the said space forward of the throat and means to position the silencer with the Venturi tube located to receive the slip stream from the propeller, the space between the shell and the Venturi tube having means to divert and disseminate a portion of the exhaust gases rearwardly contiguous to the shell and forwardly contiguous to the trailing portion of the Venturi tube whereby part of the exhaust gases are drawn directly from the space to the throat and another portion after a reverse travel rearwardly and then forwardly in the said space.

3. In a device as described, the combination of an elongated shell having a blunt annular nose at its leading edge, such nose having a blunt convex curve at any radial section, a Venturi tube assembly having a contracted section extending rearwardly from the inside portion of the nose, a throat section and a diverging trailing portion, the rear edge of the trailing portion having a direct connection to the rear end of the shell, means to position the shell and the Venturi tube in alignment with an air flow whereby the flow of air is directed through the Venturi tube and along the outside of the shell, the Venturi tube assembly having an inlet means at the throat, an exhaust gas connection to the shell located forward of the throat whereby the suction created in the throat by the decrease of air pressure of the air flow through the Venturi assembly develops an inflow of the exhaust gases to mix with the air flow through the Venturi tube, the exhaust gas connection being directly to the annular nose and having means to distribute the exhaust gas flow evenly as to the annular nose.

4. In a device as described, an elongated shell, a Venturi tube assembly connected to the forward and the rear end of the shell and provided with a throat with passages for exhaust gas, an exhaust gas connection to the shell forward of the throat, one or more cylinders open at the forward and the rear edge and spaced between the Venturi tube assembly and the shell and located relative to the exhaust gas connection to direct an exhaust gas flow rearwardly between the shell and the cylinder or cylinders and forwardly between the cylinder or cylinders and the Venturi tube assembly towards the throat.

5. In a device as described and claimed in claim 4, the throat of the Venturi tube assembly having an outwardly and forwardly directed scoop with an annular space between the scoop portion and a forward contracting portion of the Venturi tube assembly and means located between the shell and the contracting portion of the Venturi tube assembly to direct a portion of the exhaust gases towards the annular space at the said scoop.

6. In a device as described in which an elongated shell has a Venturi tube assembly mounted therein and connected to opposite ends of the shell combined with the Venturi tube assembly being characterized by a throat portion with an outwardly and forwardly flared annular scoop and the forward portion of the Venturi tube assembly having a contracting section forming an annular space between the scoop and the contracting section, an exhaust gas connection to the shell located forwardly of the throat of the Venturi tube assembly.

7. In a device as described and claimed in claim 6, a ring in the form of a partial cone located between the contracting section of the Venturi tube assembly and the shell and positioned relative to the exhaust gas connection to direct a portion of the exhaust gases towards the said annular space.

8. In a device as described, the combination of an elongated shell and a centrally positioned Venturi tube assembly, a blunt annular nose convex on any radial plane connecting the front end of the shell and the front end of the tube assembly, said tube assembly having a front portion converging to a throat, said front portion having a pronounced concave curve merging with the inside of the nose and a convex curve merging with the throat on any radial plane, the throat having an inlet connection for exhaust gases from the shell to the central portion of the throat and the trailing part of the Venturi tube from the throat having a uniform expansion in cross sectional area with the trailing end connected to the trailing end of the shell, the shell at the portion forward of the throat having an inlet for exhaust gases.

9. In a device as described, the combination of an elongated shell, a Venturi tube extending longitudinally therethrough and characterized by a converging leading end with reverse concave convex curves on longitudinal radial planes from a nose structure connecting the tube to the shell, the throat of the venturi having a gradual reverse convex curve on longitudinal radial planes with openings therethrough for exhaust gases and the trailing portion of the Venturi tube having a uniformly expanding section extending from the throat and connected at the rear end to the shell, the shell adjacent the nose having an intake connection for exhaust gases forward of the throat of the venturi.

10. In a device as described, the combination of a shell, a Venturi tube extending longitudinally therethrough having the characteristics of a blunt annular nose connecting the forward end of the Venturi tube and the forward end of the shell, the portion of the Venturi tube in front of the throat being characterized by reverse concave and convex curves on radial longitudinal planes, the portion at the throat having a slight reverse convex curve on radial longitudinal planes, the trailing portion of the Venturi tube expanding longitudinally from the throat and having its rear end connected to the rear end of the shell, the throat of the venturi at the forward end thereof having an outwardly flared scoop with the forward end of the scoop extending forwardly of the rear portion of the front converging part of the tube thereby providing an annular space for the inflow of exhaust gases to the throat of the Venturi tube, the shell at the portion adjacent the nose and forward of the throat having an intake connection for exhaust gases.

11. In a device as described, the combination of an elongated shell and a Venturi tube extending longitudinally therethrough, such tube being characterized by a forward converging end with the front edges connected to the forward portion of the shell, the throat of the venturi being characterized by a reverse convex curve on longitudinal radial planes and the trailing portion having an even expansion with the trailing end connected to the shell, the throat having passages for exhaust gases, the shell at the portion forward of the throat having an intake connection for exhaust gases, a converging ring spaced between the forward portion of the venturi and the shell having means to deflect the exhaust gas to the throat.

12. An engine exhaust silencer having a shell with a Venturi type tube extending longitudinally therethrough and connected at the front and rear ends to the shell, the combination of an intake connection for exhaust gases to the forward part of the shell in front of the throat of the venturi, such throat having openings for passage of gases, one or more separating cylinders positioned surrounding the rear portion of the tube aft the throat and positioned to deflect part of the exhaust gases rearwardly along the shell and then forwardly along the trailing part of the Venturi tube towards the throat whereby a portion of exhaust gases have a reverse direction of flow.

CURTISS L. DAVIS.